(12) United States Patent
Chung

(10) Patent No.: US 11,977,166 B2
(45) Date of Patent: May 7, 2024

(54) OPTICAL SYSTEM, METHOD AND APPARATUS FOR DIAGNOSING THE SAME

(71) Applicant: WeRide Corp., San Jose, CA (US)

(72) Inventor: Ji Yoon Chung, San Jose, CA (US)

(73) Assignee: WERIDE CORP., San Jose, CA (US)

( * ) Notice: Subject to any disclaimer, the term of this patent is extended or adjusted under 35 U.S.C. 154(b) by 761 days.

(21) Appl. No.: 16/992,078

(22) Filed: Aug. 12, 2020

(65) Prior Publication Data

US 2021/0048532 A1 Feb. 18, 2021

Related U.S. Application Data

(60) Provisional application No. 62/887,681, filed on Aug. 16, 2019, provisional application No. 62/887,682, filed on Aug. 16, 2019.

(51) Int. Cl.
*G01S 7/497* (2006.01)
*G01S 7/48* (2006.01)
*G01S 7/481* (2006.01)
*G01S 17/931* (2020.01)

(52) U.S. Cl.
CPC .......... *G01S 17/931* (2020.01); *G01S 7/4804* (2013.01); *G01S 7/4817* (2013.01); *G01S 7/497* (2013.01); *G01S 7/4816* (2013.01)

(58) Field of Classification Search
CPC .............................. G02B 27/0006; G01S 7/497
See application file for complete search history.

(56) References Cited

U.S. PATENT DOCUMENTS

| 6,656,364 B1 * | 12/2003 | Transfeld | C11B 3/10 210/665 |
| 10,725,157 B1 * | 7/2020 | Yates | G01S 7/497 |
| 2010/0315638 A1 * | 12/2010 | Goohs | G01N 15/0211 356/337 |
| 2016/0363654 A1 * | 12/2016 | Wyland | G01S 7/497 |
| 2017/0239693 A1 * | 8/2017 | Nabavi | G02B 27/0006 |
| 2018/0354468 A1 * | 12/2018 | Krishnan | B60S 1/56 |
| 2020/0114400 A1 * | 4/2020 | Henson | B08B 3/12 |
| 2020/0391702 A1 * | 12/2020 | Yamauchi | B60S 1/56 |
| 2021/0003441 A1 * | 1/2021 | Kopansky | G01D 11/26 |

FOREIGN PATENT DOCUMENTS

JP 2017003541 A * 1/2017

OTHER PUBLICATIONS

Machine translation of: JP-2017003541-A (Year: 2017).*

* cited by examiner

*Primary Examiner* — Yuqing Xiao
*Assistant Examiner* — Zhengqing Qi
(74) *Attorney, Agent, or Firm* — Jun He Law Offices P.C; James J. Zhu

(57) ABSTRACT

An optical system, a method and an apparatus for diagnosing the optical system are provided. The optical system includes a laser sensor, and a tubular sleeve surrounding the laser sensor and configured to move upwards or downwards relative to the laser sensor to cover or expose the laser sensor. The method includes: driving the tubular sleeve to cover the laser sensor to form an enclosed chamber; filling the enclosed chamber with fluid; controlling at least one of the one or more transmitters to emit an optical signal into the fluid; controlling at least one of the one or more receivers to detect a scattered signal of the optical signal; determining whether the at least one of the one or more transmitters or the at least one of the one or more receivers has a fault based on the scattered signal.

20 Claims, 13 Drawing Sheets

OPTICAL SYSTEM, METHOD AND APPARATUS FOR DIAGNOSING THE SAME

TECHNICAL FIELD

The present disclosure generally relates to an optical system, a method and an apparatus for diagnosing the optical system.

BACKGROUND

Data acquisition and subsequent generation of computer models for real-world objects is of interest in many industries. In order to obtain an accurate 3D model of an object, it is desired to take accurate measurements or samplings of surfaces that make up the object. Recent advances in scanning technology, such as technologies utilizing LiDAR scanning, have resulted in the ability to collect billions of point samples on physical surfaces. A typical LiDAR sensor includes a source of optical radiation and an optical detection device. The source of optical radiation, for example, a laser source, emits light into a region, and the optical detection device, which may include one or more optical detectors or an array of optical detectors, receives reflected light from the region and converts the reflected light into an electronic signal to identify and generate information associated with one or more target objects in the region.

The developing autonomous vehicle industry also often utilizes LiDAR technology for object detection and vehicle navigation. LiDAR sensors are often mounted on the exterior of a vehicle, for example, on the roof and/or side view mirrors. The positioning of these sensors may present some serious challenges. For example, the sensors may be subject to moisture, dust, road debris, insects, and other items. Many of these conditions can lead to the sensor getting partially or completely blocked, obscured or damaged.

SUMMARY

According to an aspect of embodiments of the present disclosure, an optical system is provided. The optical system includes: a laser sensor configured to perform distance measurement; and a tubular sleeve surrounding the laser sensor and configured to move upwards or downwards relative to the laser sensor to cover or expose the laser sensor, wherein an enclosed chamber is formed between the laser sensor and the tubular sleeve when the tubular sleeve covers the laser sensor, and the enclosed chamber can be filled with cleaning fluid for cleaning the laser sensor.

In some embodiments, the laser sensor is a light-detection and ranging (LiDAR) apparatus, and the LiDAR apparatus includes: a light source for emitting a light ray; a light receiver for receiving a reflected light from a feature in a path of the light ray; and a light window surrounding the light source and the light receiver.

In some embodiments, the tubular sleeve is configured to switch between an open state in which the light window is exposed by the tubular sleeve and a closed state in which the light window is covered by the tubular sleeve.

In some embodiments, the tubular sleeve is driven to be in the open state or in the closed state by a mechanism selected from the group consisting of a rack-and-pinion, a rack-and-worm gear, a worm-and-pinion, a spring forced wheel, a linear motor, an air pump and a liquid pump.

In some embodiments, the tubular sleeve has a plurality of nozzles allowing the cleaning fluid to flow out of or into the enclosed chamber.

In some embodiments, the optical system further includes: an inlet pump fluidly connected with the enclosed chamber through one or more of the plurality of nozzles, wherein the inlet pump is configured to pump the cleaning fluid into the enclosed chamber; a suction pump fluidly connected with the enclosed chamber through one or more of the plurality of nozzles, wherein the suction pump is configured to pump the cleaning fluid from the enclosed chamber; and a cleaning fluid tank for storing the cleaning fluid.

In some embodiments, the inlet pump and the suction pump are configured to work together to circulate the cleaning fluid.

In some embodiments, the cleaning fluid tank includes a first portion and a second portion separated by a filter, the first portion of the cleaning fluid tank is fluidly connected with the inlet pump and the second portion of the cleaning fluid tank is fluidly connected with the suction pump.

In some embodiments, the optical system further includes: an air pump configured to jet air into the enclosed chamber to dry the laser sensor.

In some embodiments, the optical system further includes: a sealing member between the tubular sleeve and the laser sensor to prevent leakage of the cleaning fluid.

In some embodiments, the sealing member is a flexible tube.

In some embodiments, the tubular sleeve has a heating mechanism for heating the laser sensor.

According to another aspect of embodiments of the present disclosure, an autonomous driving vehicle is provided. The autonomous driving vehicle includes: an optical system mounted on the autonomous driving vehicle, wherein the optical system includes: a laser sensor configured to perform distance measurement; and a tubular sleeve surrounding the laser sensor and configured to move upwards or downwards relative to the laser sensor to cover or expose the laser sensor, wherein an enclosed chamber is formed between the laser sensor and the tubular sleeve when the tubular sleeve covers the laser sensor, and the enclosed chamber can be filled with cleaning fluid for cleaning the laser sensor.

In some embodiments, the laser sensor is a light-detection and ranging (LiDAR) apparatus.

According to another aspect of embodiments of the present disclosure, a method for cleaning a laser sensor which performs distance measurement is provided. The method includes: driving a tubular sleeve surrounding the laser sensor to move upwards or downwards relative to the laser sensor to cover or expose the laser sensor, wherein an enclosed chamber is formed between the laser sensor and the tubular sleeve when the tubular sleeve covers the laser sensor; and filling the enclosed chamber with cleaning fluid to clean the laser sensor.

In some embodiments, the laser sensor is a light-detection and ranging (LiDAR) apparatus, and the LiDAR apparatus includes: a light source for emitting a light ray; a light receiver for receiving a reflected light from a feature in a path of the light ray; and a light window surrounding the light source and the light receiver; and the tubular sleeve is driven to expose the light window in an open state, or to cover the light window in a closed state.

In some embodiments, the method further includes: pumping, by an inlet pump fluidly connected with the enclosed chamber, the cleaning fluid into the enclosed chamber; and pumping, by a suction pump fluidly connected with the enclosed chamber, the cleaning fluid from the enclosed chamber.

In some embodiments, the method further includes: controlling the inlet pump and the suction pump to work together to circulate the cleaning fluid.

In some embodiments, the method further includes: jetting, by an air pump, air into the enclosed chamber to dry the laser sensor.

In some embodiments, the method further includes: heating, by a heating mechanism mounted on the tubular sleeve, the laser sensor.

According to another aspect of embodiments of the present disclosure, a method for diagnosing an optical system is provided. The optical system includes: a laser sensor including one or more transmitters and one or more receivers, and a tubular sleeve surrounding the laser sensor and configured to move upwards or downwards relative to the laser sensor to cover or expose the laser sensor. The method includes: driving the tubular sleeve to cover the laser sensor to form an enclosed chamber between the laser sensor and the tubular sleeve; filling the enclosed chamber with fluid; controlling at least one of the one or more transmitters to emit an optical signal into the fluid; controlling at least one of the one or more receivers to detect a scattered signal of the optical signal; determining whether the at least one of the one or more transmitters or the at least one of the one or more receivers has a fault based on the scattered signal.

In some embodiments, the optical signal having a predetermined waveform.

In some embodiments, determining whether the at least one of the one or more transmitters or the at least one of the one or more receivers has a fault based on the scattered signal includes: detecting a waveform of the scattered signal; and comparing the waveform of the scattered signal with the predetermined waveform of the optical signal to determine whether the at least one of the one or more transmitters or the at least one of the one or more receivers has a fault.

In some embodiments, comparing the waveform of the scattered signal with the predetermined waveform of the optical signal to determine whether the at least one of the one or more transmitters or the at least one of the one or more receivers has a fault includes: detecting a leading edge and a trailing edge of the scattered signal; and comparing the leading edge and the trailing edge of the scattered signal with a leading edge and a trailing edge of the predetermined waveform of the optical signal respectively to determine whether the at least one of the one or more transmitters or the at least one of the one or more transmitters has a fault.

In some embodiments, the predetermined waveform includes a square wave.

In some embodiments, controlling at least one of the one or more transmitters to emit an optical signal into the fluid includes: controlling all of the one or more transmitters to emit the optical signal into the fluid in a predetermined order; and controlling at least one of the one or more receivers to detect a scattered signal of the optical signal includes: controlling all of the one or more receivers to detect the scattered signal when any of the one or more transmitters is controlled to emit the optical signal into the fluid.

In some embodiments, controlling at least one of the one or more transmitters to emit an optical signal into the fluid includes: controlling all of the one or more transmitters to emit the optical signals into the fluid in a predetermined order for one or more periods; and controlling at least one of the one or more receivers to detect a scattered signal of the optical signal includes: controlling each of the one or more receivers to detect the scattered signals in one period that all of the one or more transmitters are controlled to emit the optical signals into the fluid in the predetermined order.

In some embodiments, the method further includes: providing a warning to a user when it is determined that the at least one of the one or more transmitters or the at least one of the one or more receivers has a fault.

In some embodiments, the laser sensor is a light-detection and ranging (LiDAR) apparatus.

In some embodiments, the fluid is cleaning fluid for cleaning the laser sensor.

According to another aspect of embodiments of the present disclosure, an apparatus for diagnosing an optical system is provided. The apparatus includes: a processor; and a memory coupled to the processor to store instructions, which when executed by the processor, cause the processor to perform operations of diagnosing an optical system. The optical system includes: a laser sensor including one or more transmitters and one or more receivers, and a tubular sleeve surrounding the laser sensor and configured to move upwards or downwards relative to the laser sensor to cover or expose the laser sensor. The operations includes: driving the tubular sleeve to cover the laser sensor to form an enclosed chamber between the laser sensor and the tubular sleeve; filling the enclosed chamber with fluid; controlling at least one of the one or more transmitters to emit an optical signal into the fluid; controlling at least one of the one or more receivers to detect a scattered signal of the optical signal; and determining whether the at least one of the one or more transmitters or the at least one of the one or more receivers has a fault based on the scattered signal.

In some embodiments, the optical signal having a predetermined waveform.

In some embodiments, determining whether the at least one of the one or more transmitters or the at least one of the one or more receivers has a fault based on the scattered signal includes: detecting a waveform of the scattered signal; and comparing the waveform of the scattered signal with the predetermined waveform of the optical signal to determine whether the at least one of the one or more transmitters or the at least one of the one or more receivers has a fault.

In some embodiments, comparing the waveform of the scattered signal with the predetermined waveform of the optical signal to determine whether the at least one of the one or more transmitters or the at least one of the one or more receivers has a fault includes: detecting a leading edge and a trailing edge of the scattered signal; and comparing the leading edge and the trailing edge of the scattered signal with a leading edge and a trailing edge of the predetermined waveform of the optical signal respectively to determine whether the at least one of the one or more transmitters or the at least one of the one or more transmitters has a fault.

In some embodiments, the predetermined waveform includes a square wave.

In some embodiments, controlling at least one of the one or more transmitters to emit an optical signal into the fluid includes: controlling all of the one or more transmitters to emit the optical signal into the fluid in a predetermined order; and controlling at least one of the one or more receivers to detect a scattered signal of the optical signal includes: controlling all of the one or more receivers to detect the scattered signal when any of the one or more transmitters is controlled to emit the optical signal having the predetermined waveform.

In some embodiments, controlling at least one of the one or more transmitters to emit an optical signal into the fluid includes: controlling all of the one or more transmitters to emit the optical signals into the fluid in a predetermined order for one or more periods; and controlling at least one of the one or more receivers to detect a scattered signal of the optical signal includes: controlling each of the one or more receivers to detect the scattered signals in one period that all of the one or more transmitters are controlled to emit the optical signals having the predetermined waveforms in the predetermined order.

In some embodiments, the operations further includes: providing a warning to a user when it is determined that the at least one of the one or more transmitters or the at least one of the one or more receivers has a fault.

In some embodiments, the laser sensor is a light-detection and ranging (LiDAR) apparatus.

In some embodiments, the fluid is cleaning fluid for cleaning the laser sensor.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

BRIEF DESCRIPTION OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

The same reference numbers will be used throughout the drawings to refer to the same or like parts.

DETAILED DESCRIPTION OF THE PREFERRED EMBODIMENTS

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

In this application, the use of the singular includes the plural unless specifically stated otherwise. In this application, the use of "or" means "and/or" unless stated otherwise. Furthermore, the use of the term "including" as well as other forms such as "includes" and "included" is not limiting. In addition, terms such as "element" or "component" encompass both elements and components including one unit, and elements and components that include more than one subunit, unless specifically stated otherwise. Additionally, the section headings used herein are for organizational purposes only, and are not to be construed as limiting the subject matter described.

The present disclosure generally provides an optical system, and a method and apparatus for diagnosing the optical system. In the following, a LiDAR system 100, an optical system 200 and a method for controlling the optical system 200 are firstly described with reference to FIGS. 1-9. Then, an apparatus 1000 for diagnosing the optical system 200 is described with reference to FIG. 10, and methods 1100, 1400 and 1500 for diagnosing the optical system 200 are described with reference to FIGS. 11-15.

Figure 1:
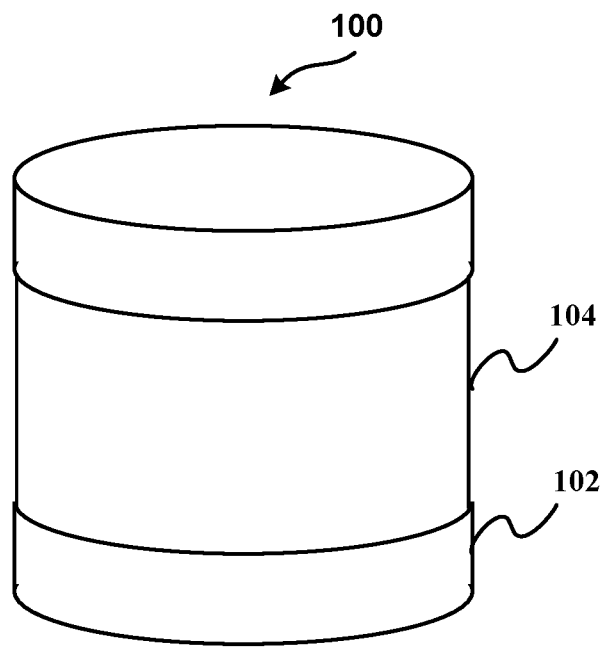
FIG. 1 illustrates a structural diagram of a LiDAR system.

FIG. 1 illustrates an example of a LiDAR system 100. As shown in FIG. 1, the LiDAR system 100 includes a housing 102 and a light window 104. In the interior of the LiDAR system 100, there may be a source of optical radiation and an optical detection device. The source of optical radiation may emit laser lights through the light window 104, and reflected lights may return back into the housing 102 through the light window 104 and be received by the optical detection device. The internal components and operation of the LiDAR system 100 are known in the art and will not be described in detail.

In some embodiments, the light window 104 may include an optical filter, and the optical filter may be coated with specific coating material such that laser lights with certain wavelengths may be blocked and absorbed by the optical filter. In some embodiments, however, these coating materials may be temperature sensitive, not hard enough, or not flexible enough to absorb shock.

In some embodiments, the LiDAR system 100 may rest on or be mounted to a swivel bearing which enables the LiDAR system 100 to perform an angular sweep or rotate for 360 degrees. In some embodiments, the LiDAR system 100 may be mounted on the exterior of an autonomous vehicle, for example, on the roof and/or side view mirrors, and data/signal of the reflected light may be analyzed using an on-board processor or a vehicle computer. The data may be used to image a region surrounding the autonomous vehicle. This imaging device may be a functionality included as a part of an autonomous driving system, for example, in cooperation with cameras, GPS, or other guidance/imaging systems.

As described above, the LiDAR system 100 are often mounted on the exterior of a vehicle. Thus, the LiDAR system 100 may be subject to extreme temperature, wind, moisture, ultraviolet light, dust, road debris, insects, and other items. Many of these conditions can lead to the sensor lens getting partially or completely blocked or obscured, thus hindering the performance of the sensors. For example, when the vehicle is driving, the vehicle may come across many kinds of external objects in the air. Some of the objects may be small enough and invisible, but some others may be big such as insects or birds. From the standpoint of a laser detection and ranging sensor, a small object attached to the sensor surface may lead to overall degradation of sensing quality, and a large object may create a blind spot in the view of the sensor. As the sensor is small, a small object attached onto the sensor surface may affect the imaging performance a lot. For example, if a 10 mm*10 mm sized insect is attached onto a surface of a 10 cm diameter senor, a 20 m*20 m blind spot may be formed in the view of the sensor area at a 100 m distance.

In a conventional LiDAR system, the sensor may be configured with a sprayer to spray cleaning liquid from the bottom or top side of the sensor. However, this method may have the following drawbacks: 1) there is a tradeoff between fluid pressure and sensor surface damage, where raising the pressure of the fluid may increase the cleaning effect but damage the sensor surface; 2) the fluid may freeze in winter; 3) environmental pollution may be caused when special chemicals are used; and 4) the maintenance cost is high, since the cleaning liquid is non-recyclable.

Figure 2A:
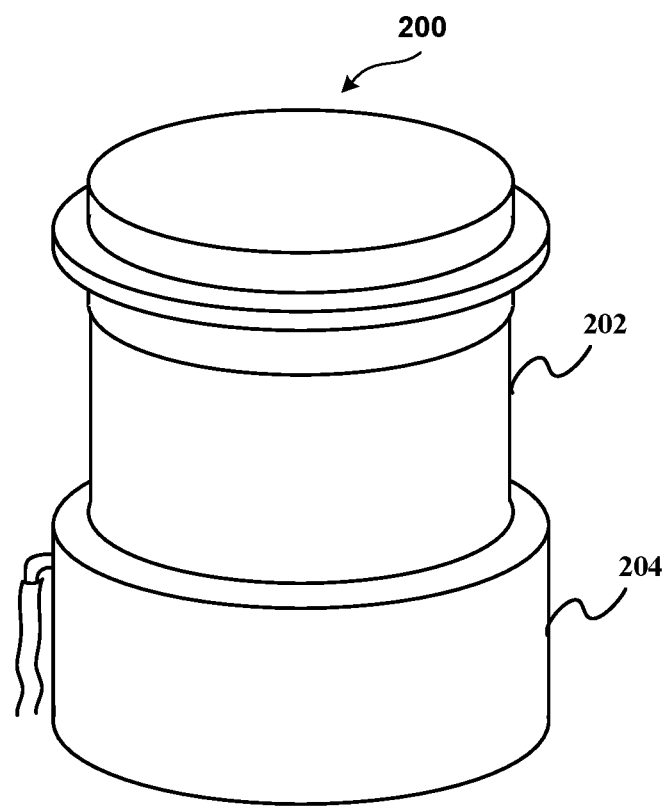
FIGS. 2(a), 2(b) and 2(c) illustrate an open state, an intermediate state and a closed state of an optical system, respectively, according to an embodiment of the present disclosure.
Figure 2B:
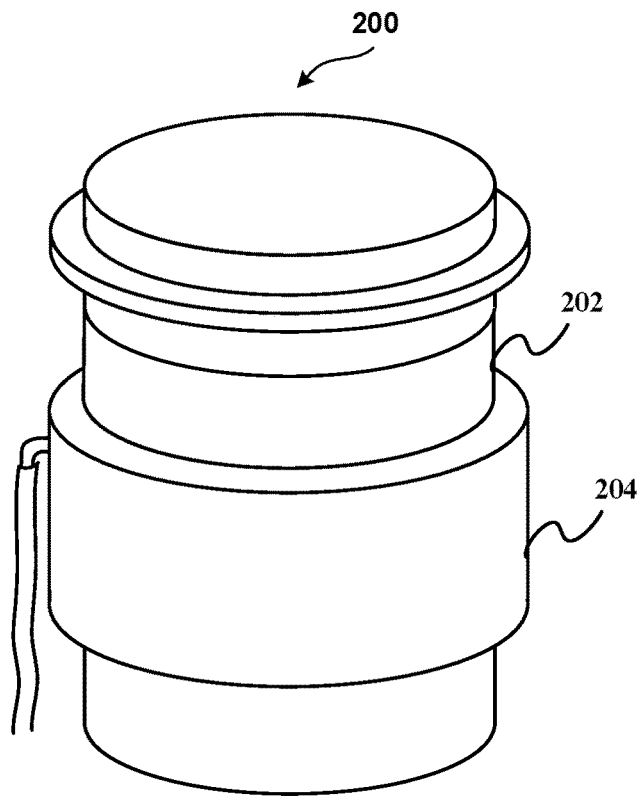
Figure 2C:
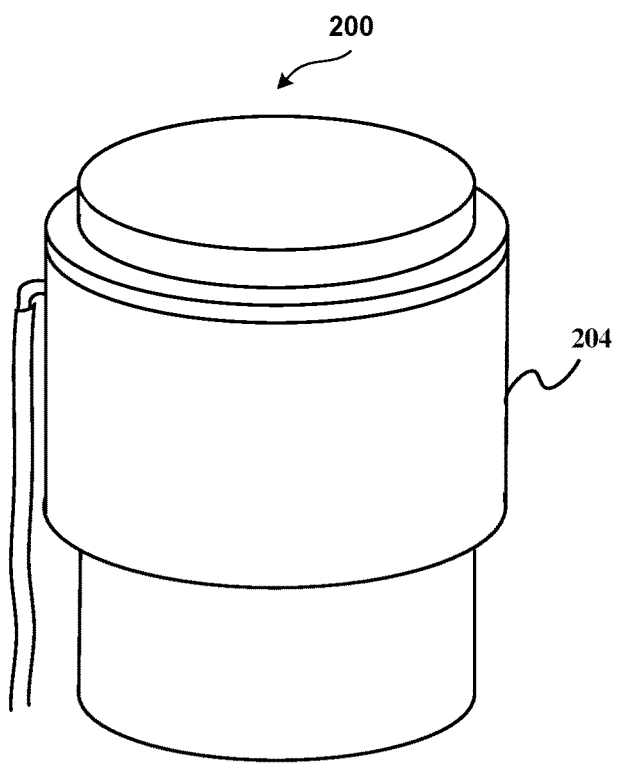

With reference to FIGS. 2(a), 2(b) and 2(c), a structural diagram of an optical system 200 is illustrated according to an embodiment of the present disclosure. The optical system 200 includes a laser sensor 202 configured to perform distance measurement, and a tubular sleeve 204 surrounding the laser sensor 202. The tubular sleeve 204 is configured to move upwards or downwards relative to the laser sensor 202 to cover or expose the laser sensor, e.g. move in a vertical direction as shown in FIGS. 2(a), 2(b) and 2(c). In some embodiments, the laser sensor 202 is of a cylindrical shape and the tubular sleeve 204 may move along an outer surface of the cylindrical laser sensor 202. When the tubular sleeve 204 covers the laser sensor 202, an enclosed chamber (not shown) can be formed between the laser sensor 202 and the tubular sleeve 204. Then, the enclosed chamber can be filled with cleaning fluid for cleaning the laser sensor 202.

In some embodiments, the laser sensor 202 may be a light-detection and ranging (LiDAR) apparatus. The LiDAR apparatus may include: a light source for emitting a light ray; a light receiver for receiving a reflected light from a feature in a path of the light ray; and a light window surrounding the light source and the light receiver. The LiDAR apparatus may be the same as the LiDAR system 100 as shown in FIG. 1, and will not be described in detail herein. In some embodiments, the optical system 200 may be mounted on the exterior of an autonomous vehicle.

The tubular sleeve 204 is configured to switch between an open state, as shown in FIG. 2(a), in which the light window of the LiDAR apparatus is exposed by the tubular sleeve 204, and a closed state, as shown in FIG. 2(c), in which the light window of the LiDAR apparatus is covered by the tubular sleeve 204. An intermediate state of the tubular sleeve 204 is also shown in FIG. 2(b), so as to clearly illustrate the translation movement of the tubular sleeve 204 between the open state and the closed state. In the open state, the LiDAR apparatus may be in an operation mode. That is, the light ray emitted by the light source can pass through the light window, and the reflected light can also return through the light window and be received by the light receiver. In the closed state, the enclosed chamber formed between the LiDAR apparatus and the tubular sleeve 204 may be filled with the cleaning fluid for cleaning the light window of the LiDAR apparatus.

It should be noted that the laser sensor 202 in FIGS. 2(a), 2(b) and 2(c) is referred to as a LiDAR apparatus in some embodiments of the present disclosure, but this is merely for illustrative purpose. The present disclosure may apply to any laser-based sensor having a lens that is exposed to outdoor/indoor environment or otherwise susceptible to becoming dirty.

In some embodiments, the tubular sleeve 204 may be operable to switch between the open state and the closed state by a mechanism selected from the group consisting of a rack-and-pinion, a rack-and-worm gear, a worm-and-pinion, a spring forced wheel, a linear motor, an air pump and a liquid pump.

Figure 3:
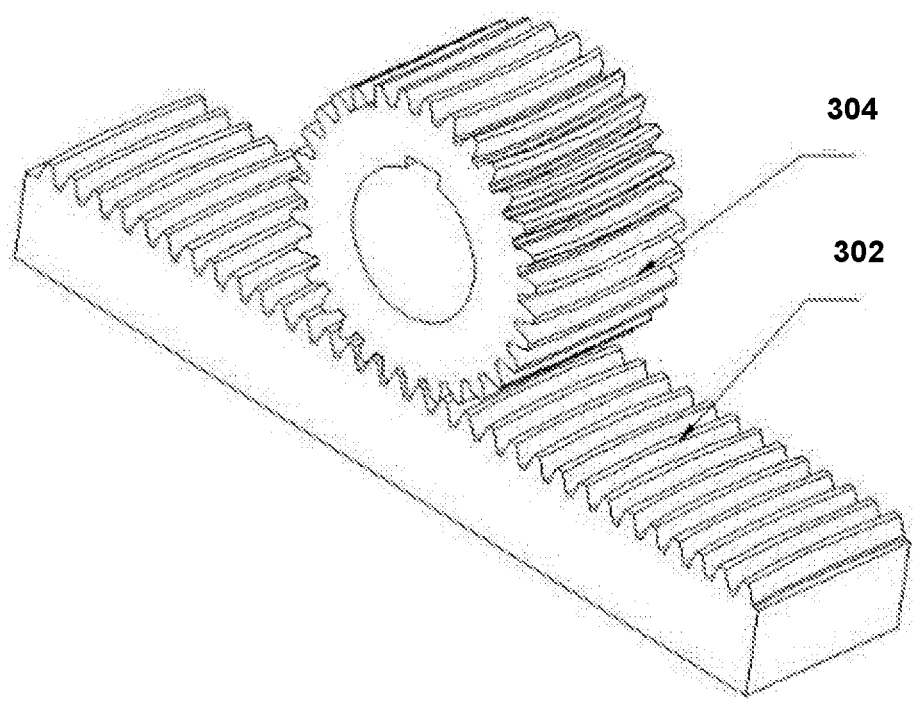
FIG. 3 illustrates a rack-and-pinion mechanism according to an embodiment of the present disclosure.

With reference to FIG. 3, a rack-and-pinion mechanism is illustrated according to an embodiment of the present disclosure. The rack 302 may be mounted inside or outside the tubular sleeve 204, and the pinion 304 may be driven by a motor to move the tubular sleeve 204 up and down.

Figure 4:
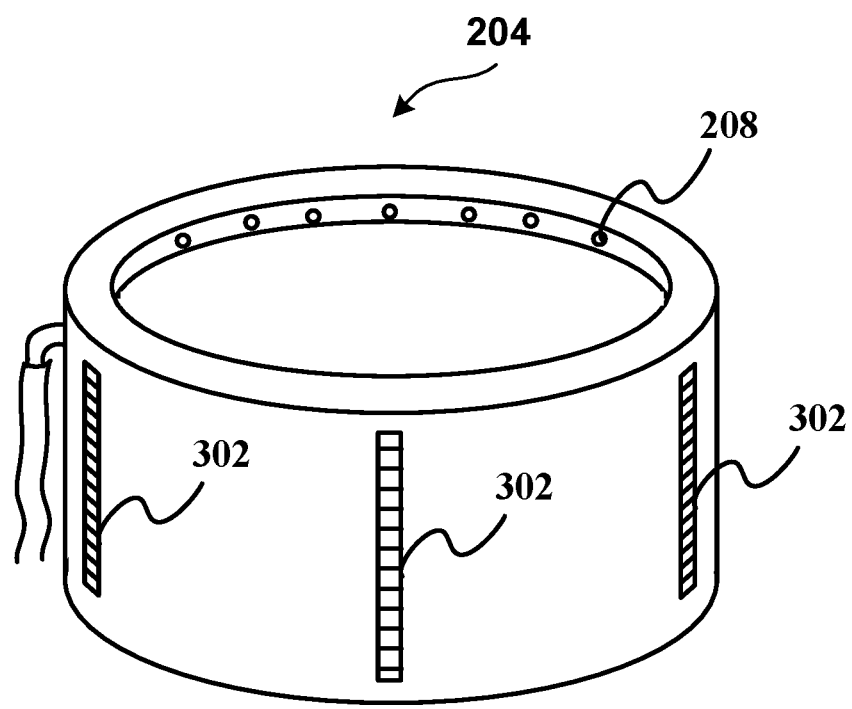
FIG. 4 illustrates a tubular sleeve of the optical system according to an embodiment of the present disclosure.

In some embodiments, as shown in FIG. 4, there may be four racks disposed inside the tubular sleeve 204, and each of the four racks may be engaged with a pinion.

Figure 5:
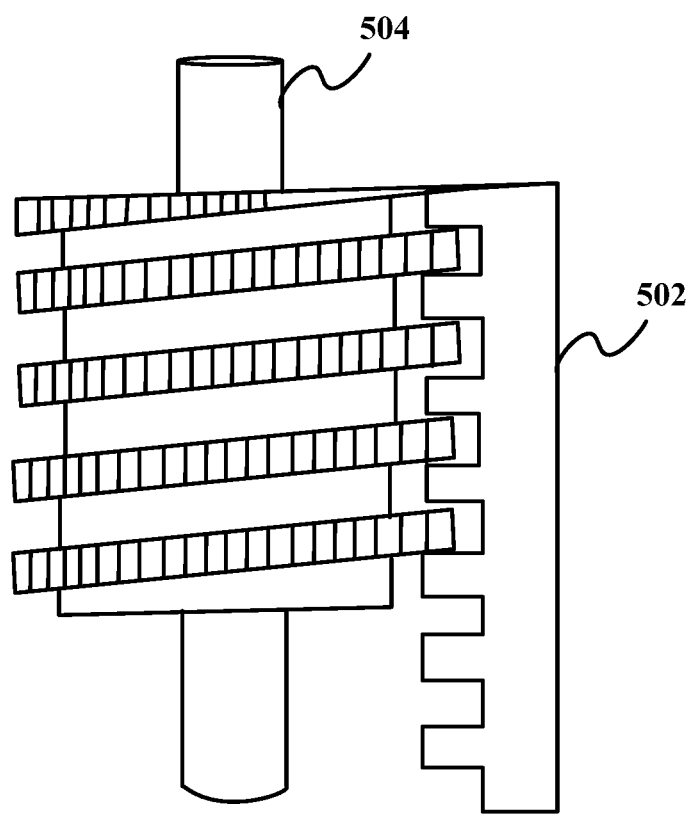
FIG. 5 illustrates a rack-and-worm gear mechanism according to an embodiment of the present disclosure.

With reference to FIG. 5, a rack-and-worm gear mechanism is illustrated according to an embodiment of the present disclosure. The rack 502 may be mounted inside or outside the tubular sleeve 204, and the worm gear 504 may be driven by a motor to move the tubular sleeve 204 up and down.

It should be noted that, the rack-and-pinion mechanism and the rack-and-worm gear mechanism are only examples of the mechanism for driving the tubular sleeve 204 up and down. In other embodiments, any suitable mechanism may be used.

Referring back to FIG. 4, the tubular sleeve 204 has a plurality of nozzles 208. The plurality of nozzles 208 may allow the cleaning fluid to flow out of or into the enclosed chamber formed between the laser sensor 202 and the tubular sleeve 204 when the tubular sleeve 204 covers the laser sensor 202.

Figure 6:
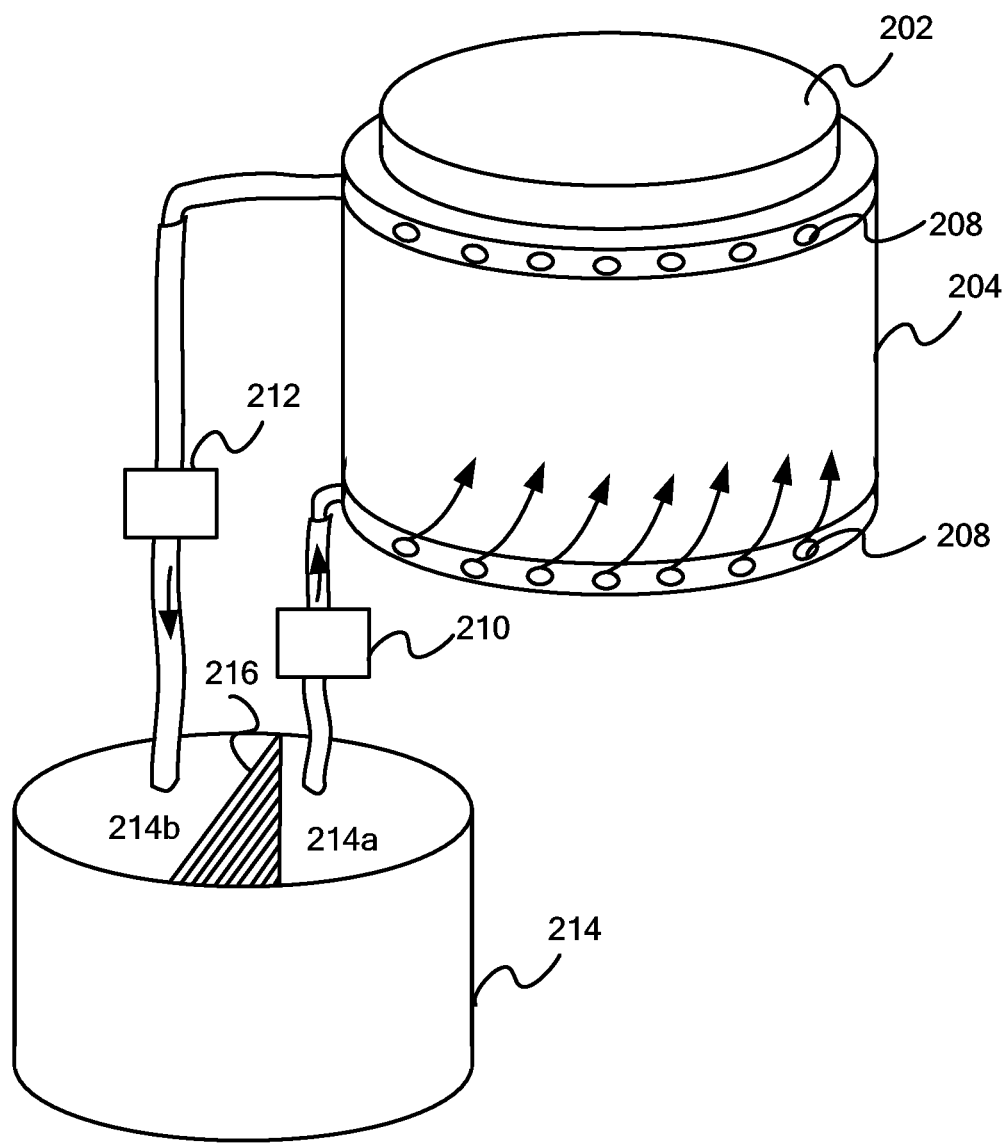
FIG. 6 illustrates an optical system according to another embodiment of the present disclosure.

In some embodiments, as shown in FIG. 6, the optical system may further include an inlet pump 210 and a suction pump 212. The inlet pump 210 is fluidly connected with the enclosed chamber through one or more of the plurality of nozzles, for example, the nozzles located at the bottom end of the tubular sleeve 204. The inlet pump 210 is configured to pump the cleaning fluid into the enclosed chamber formed between the laser sensor 202 and the tubular sleeve 204 when the tubular sleeve 204 covers the laser sensor 202. The suction pump 212 is also fluidly connected with the enclosed chamber through one or more of the plurality of nozzles, for example, the nozzles located at the top end of the tubular sleeve 204. The suction pump 212 is configured to pump the cleaning fluid from the enclosed chamber, after the cleaning process of the laser sensor 202 is completed. For example, when the tubular sleeve 204 is moving downwards relative to the laser sensor 202 and the enclosed chamber formed between the laser sensor 202 and the tubular sleeve 204 becomes smaller, the suction pump 212 starts to pump the cleaning fluid from the enclosed chamber. The details of the pumping process will be further described below with reference to FIG. 7. According to embodiments of the present disclosure, there is no need to use high pressure water jet to remove the dirt on the laser sensor, and thus the surface of the laser sensor is protected.

It should be understood that the embodiments shown in FIG. 6 are presented by way of example only, and not limitation. In some embodiments, the inlet pump and the suction pump may work at the same time. Namely, the inlet pump and the suction pump can be configured to work together to circulate the cleaning fluid, so as to clean the surface of the laser sensor. In some embodiments, the inlet pump is fluidly connected with the enclosed chamber through one or more nozzles located at the top end of the tubular sleeve, and the suction pump is fluidly connected with the enclosed chamber through one or more nozzles located at the bottom end of the tubular sleeve. In some embodiments, the nozzles are disposed at only one end of the tubular sleeve (i.e., the top end or the bottom end), and both the inlet pump and the suction pump are connected with the enclosed chamber through these nozzles at the same end of the tubular sleeve. In some alternative embodiments, the optical system may include only one pump to pump the cleaning fluid into and out of the enclosed chamber at different times.

In some embodiments, as shown in FIG. 6, the optical system may further include a cleaning fluid tank 214 for storing the cleaning fluid. In some embodiments, the cleaning fluid tank 214 may include a first portion 214a and a second portion 214b. The first portion 214a of the cleaning fluid tank 214 is fluidly connected with the inlet pump 210, and the second portion 214b of the cleaning fluid tank 214 is fluidly connected with the suction pump 212. As the cleaning fluid is recycled into the cleaning fluid tank 214, all the cleaning fluid can be reused.

In some embodiments, the first portion 214a and the second portion 214b may be separated by a filter 216, such that particles washed from the laser sensor 102 may not flow from the second portion 214b into the first portion 214a.

Figure 7:
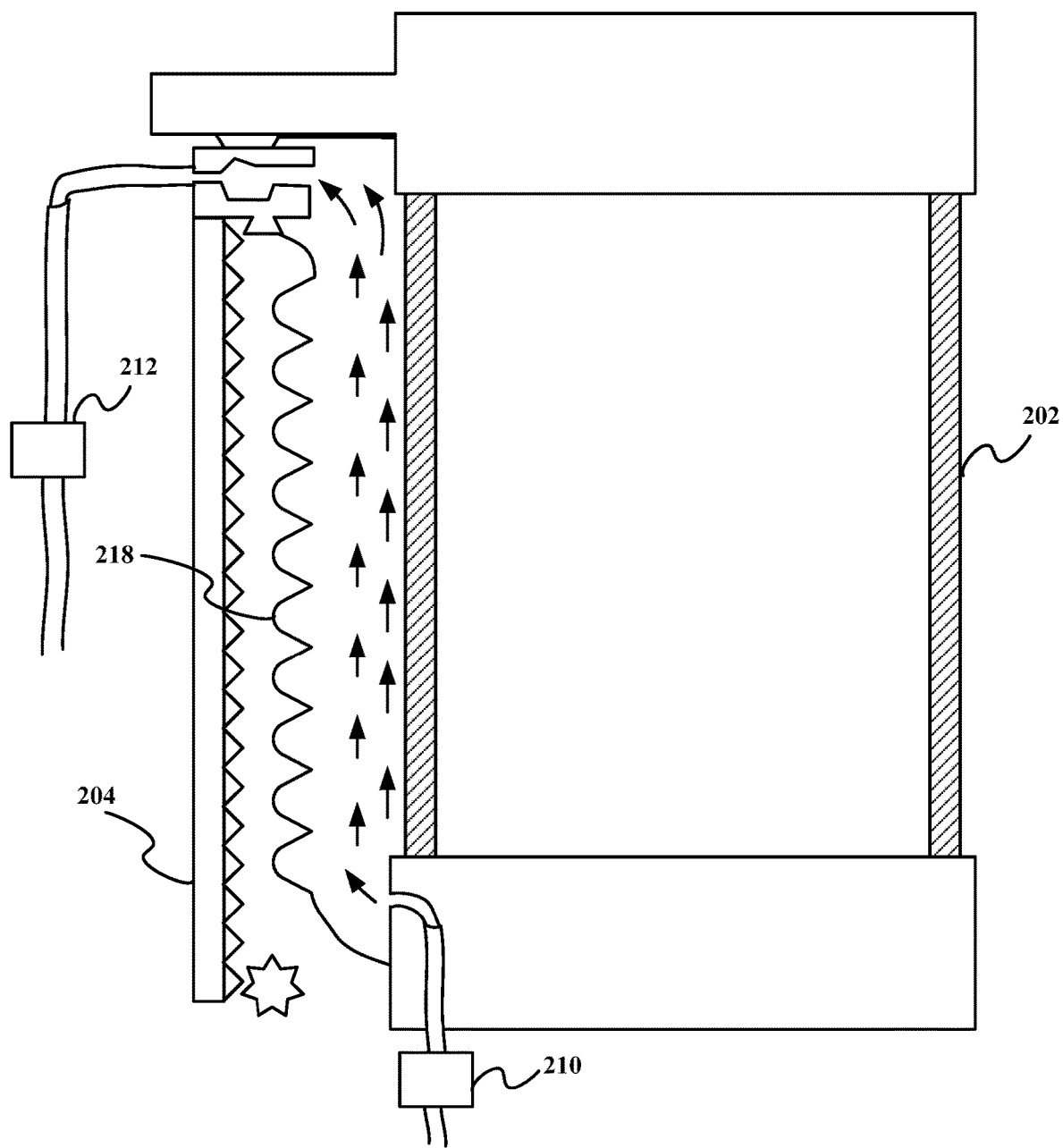
FIG. 7 illustrates an enlarged portion of the optical system of FIG. 6 according to another embodiment of the present disclosure.
Figure 8:
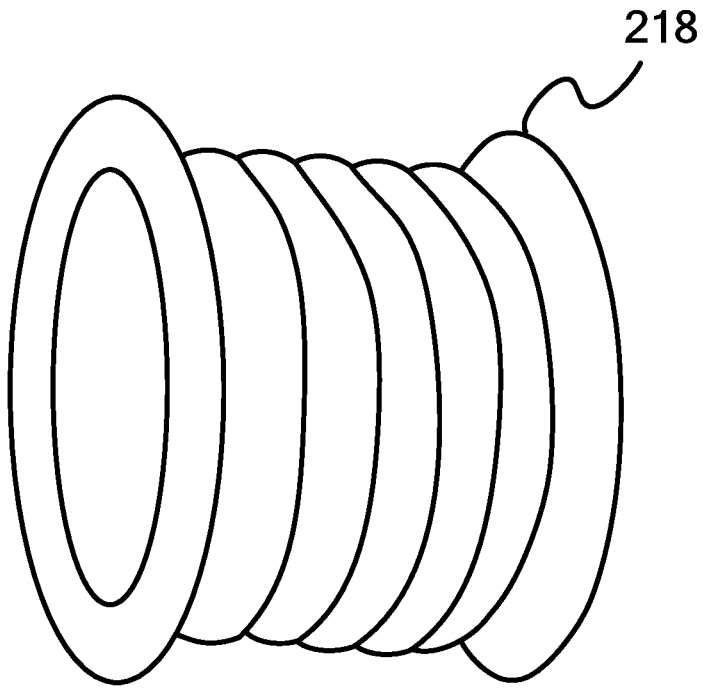
FIG. 8 illustrates a flexible tube according to another embodiment of the present disclosure.

With reference to FIG. 7, an enlarged portion of the optical system of FIG. 6 is illustrated according to an embodiment of the present disclosure. As shown in FIG. 7, a sealing member 218 is installed between the tubular sleeve 204 and the laser sensor 202 to prevent leakage of the cleaning fluid. In some embodiments, the sealing member 218 may be a flexible tube as shown in FIG. 8. For example, as shown in FIG. 7, a first end of the flexible tube 218 is fixedly connected to the a bottom side of the laser sensor 202, and a second end of the flexible tube 218 is fixedly connected to a top side of the tubular sleeve 204 and closely fits the surface of the laser sensor 202. In some embodiments, when the tubular sleeve 204 is driven to move upwards relative to the laser sensor 202, the second end (i.e., the top end) of the flexible tube 218 moves upwards simultaneously, and the enclosed chamber is formed between the flexible tube 218 and the laser sensor 202. After the flexible tube 218 covers the entire surface of the laser sensor 202, the inlet pump 210 is configured to pump the cleaning fluid into the enclosed chamber formed between the laser sensor 202 and the flexible tube 218. Then, after the cleaning process, the tubular sleeve 204 is driven to move downwards relative to the laser sensor 202. As the second end of the flexible tube 218 may move downwards at the same time but the first end is stationary, the enclosed chamber formed between the laser sensor 202 and the flexible tube 218 becomes smaller. Thus, the suction pump 212 can easily pump the cleaning fluid out from the enclosed chamber when the tubular sleeve 204 moves downwards relative to the laser sensor 202.

In some embodiments, the optical system may further include an air pump. The air pump may be configured to jet air into the enclosed chamber to dry the laser sensor, after the laser sensor 202 is cleaned by the cleaning fluid and the cleaning fluid is removed. Once the surface of the laser sensor is dry, the tubular sleeve 204 is switched from the closed state to the open state, and the laser sensor 202 is ready for scanning operation. In some embodiments, the air jetted into the enclosed chamber is warm, for example, with a temperature higher than the room temperature.

In some embodiments, the optical system for example, the tubular sleeve, may include a heating mechanism for heating the laser sensor, such that the laser sensor may be heated to meet an operating temperature as needed, and ice or frost formed on the surface of the laser sensor can be removed in winter.

Figure 9:
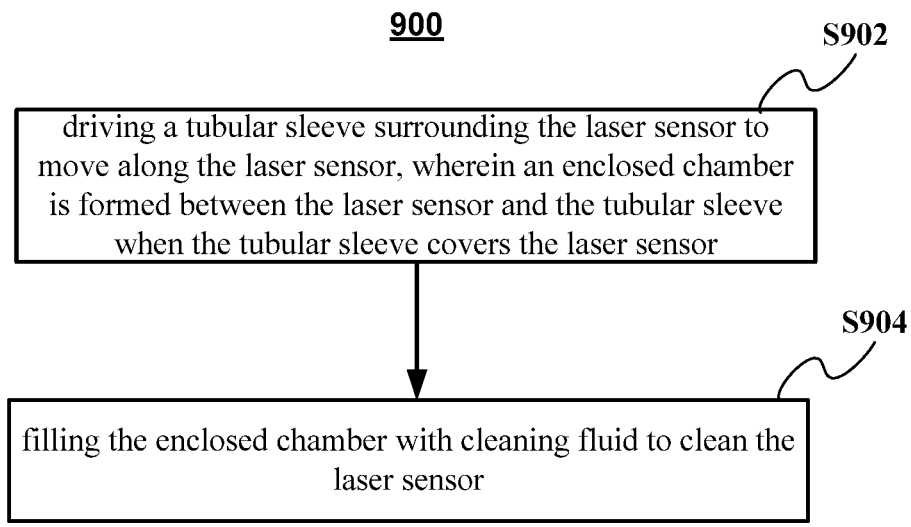
FIG. 9 illustrates a flow chart of a method for cleaning a laser sensor according to another embodiment of the present disclosure.

Moreover, a method for cleaning a laser sensor which performs distance measurement is provided. As shown in FIG. 9, a method 900 for cleaning a laser sensor includes steps S902 and S904. In S902, a tubular sleeve surrounding the laser sensor is driven to move upwards or downwards relative to the laser sensor to cover or expose the laser sensor, wherein an enclosed chamber is formed between the laser sensor and the tubular sleeve when the tubular sleeve covers the laser sensor. In S904, the enclosed chamber is filled with a cleaning fluid to clean the laser sensor.

In some embodiments, the laser sensor is a LiDAR apparatus, and the LiDAR apparatus includes: a light source for emitting a light ray; a light receiver for receiving a reflected light from a feature in a path of the light ray; and a light window surrounding the light source and the light receiver. The tubular sleeve is driven to expose the light window in an open state, or to cover the light window in a closed state. In some embodiments, the method may further include: pumping, by an inlet pump fluidly connected with the enclosed chamber, the cleaning fluid into the enclosed chamber; and pumping, by a suction pump fluidly connected with the enclosed chamber, the cleaning fluid from the enclosed chamber. In some embodiments, the method may further include: controlling the inlet pump and the suction pump to work together to circulate the cleaning fluid. In some embodiments, the method may further include: jetting, by an air pump, air into the enclosed chamber to dry the laser sensor. In some embodiments, the method may further include: heating, by a heating mechanism mounted on the tubular sleeve, the laser sensor.

The method may be controlled by an on-board processor, and may be initiated by a perception algorithm or a power-on or reset operation of the optical system. More details about the method may refer to the above description of the optical system, and are not described in detail herein.

According another aspect of the present disclosure, an apparatus for diagnosing an optical system, for example, the optical system 200 described above, is provided.

Figure 10:
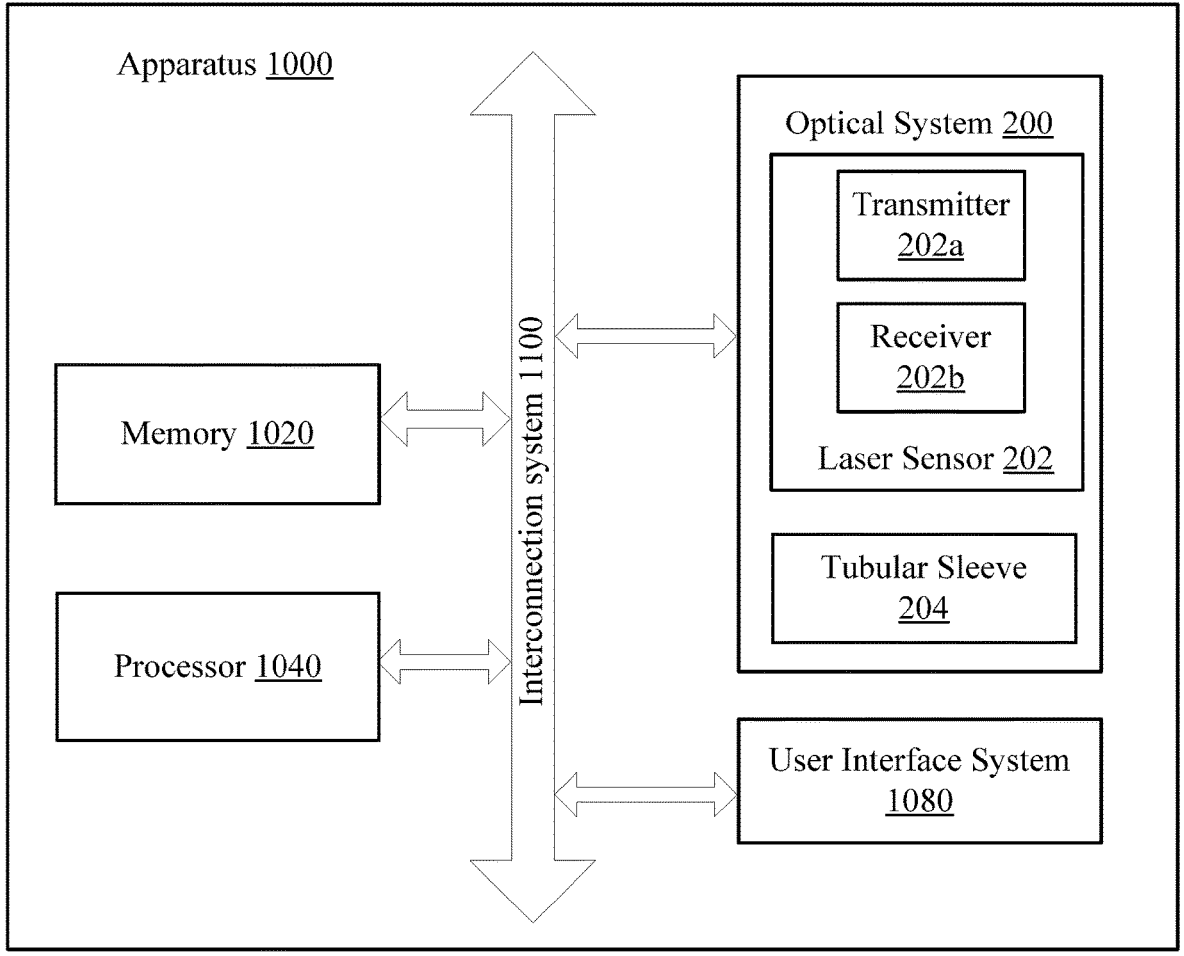
FIG. 10 illustrates a block diagram of an apparatus for diagnosing an optical system according to an embodiment of the present disclosure.

FIG. 10 illustrates a block diagram of an apparatus 1000 for diagnosing the optical system 200 of FIG. 2 according to an embodiment of the present disclosure. The apparatus 1000 includes a memory 1020, a processor 1040, the optical system 200, a user interface (UI) system 1080 and an interconnection system 1100. The memory 1020, the processor 1040, the optical system 200 and the user interface (UI) system 1080 are directly or indirectly connected with each other for data and signal transmission or exchange via the interconnection system 1100. The interconnection system 1100 may be one or more signal lines or communication buses, such as a controller area network (CAN) bus.

The apparatus 1000 may include at least one program function module in form of software or firmware stored or embedded in the memory 1020 and executed by the processor 1040. The processor 1040 is used for performing executable instructions and programs stored in the memory 1020. The memory 1020 is used for storing various types of data of the apparatus 1000. The memory 1020 may be an internal memory of the apparatus 1000, or a removable memory. For example, the memory 1020 may include, but not be limited to, random access memory (RAM), read only memory (ROM), programmable read-only memory (PROM), erasable read only memory (EPROM), electrically erasable read only memory (EEPROM) and the like.

The processor 1040 may be an integrated circuit chip with signal and data processing capability. The processor 1040 as described may be a general purpose processor, including a central processor (CPU), a network processor (NP) and etc. The processor 1040 can also be a digital signal processor (DSP), application specific integrated circuit (ASIC), Field-programmable gate array (FPGA) or other programmable logic device, discrete gate or transistor logic, discrete hardware components. The processor 1040 can execute or implement methods, steps and logic diagrams disclosed in embodiments of the present disclosure. In some embodiments, the processor 1040 can generate and/or transmit a variety of communication signals and/or commands for controlling the optical system 200 and the UI system 1080. For example, by transmitting a variety of commands, the processor 1040 can control the tubular sleeve 204 to cover the laser sensor 202, control a transmitter of the laser sensor 202 to emit an optical signal, or control a receiver of the laser sensor 202 to receive a scattered signal.

Figure 13:
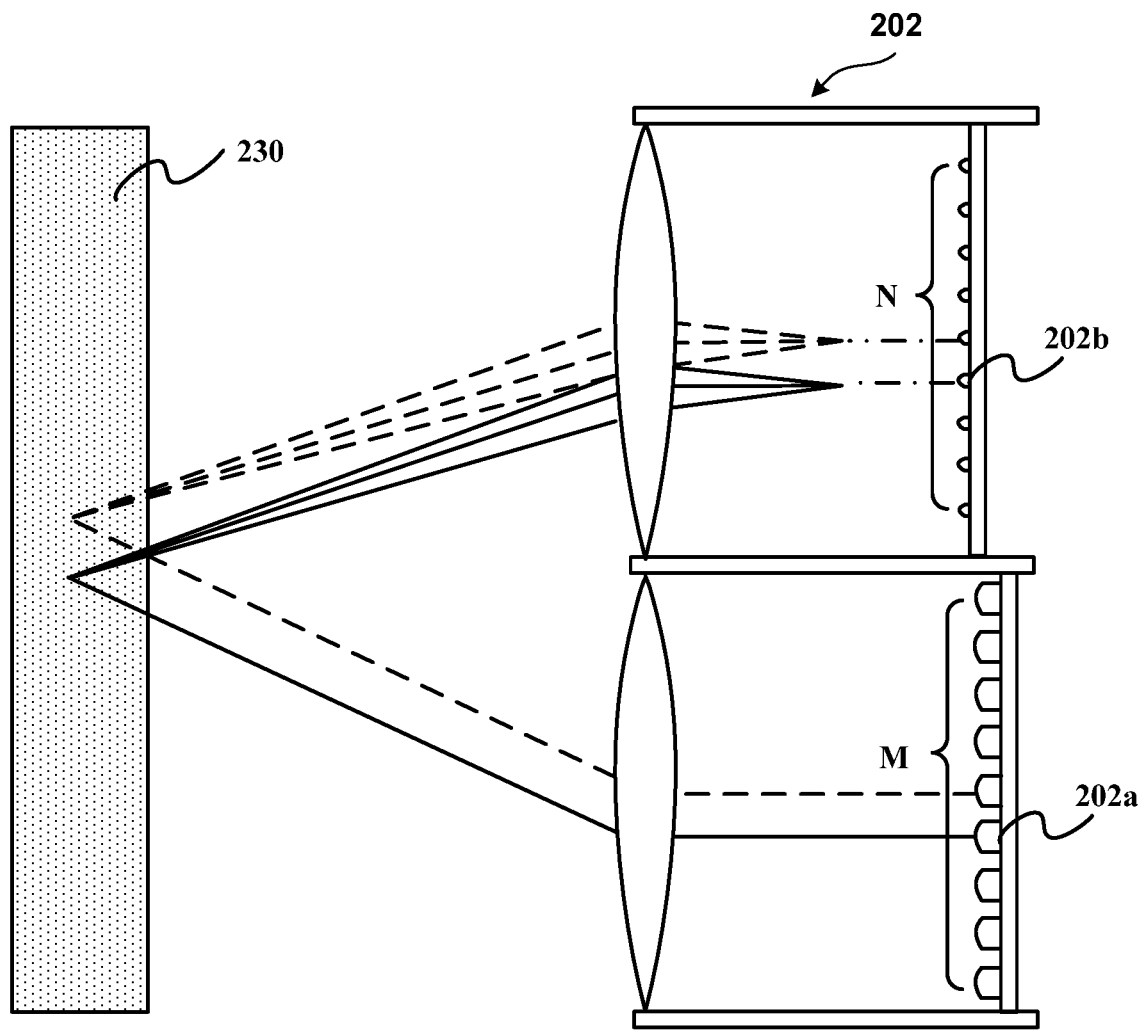
FIG. 13 illustrates an optical path in the optical system according to an embodiment of the present disclosure.

The optical system 200 includes a laser sensor 202 and a tubular sleeve 204, and the tubular sleeve 204 surrounds the laser sensor 202 and is configured to move upwards or downwards relative to the laser sensor 202 to cover or expose the laser sensor 202, as shown in FIGS. 2(a)-2(c). Referring to FIG. 13, the laser sensor 202 may include one or more transmitters 202a and one or more receivers 202b. In some embodiments, the transmitter 202a includes a vertical-cavity surface-emitting laser (VCSEL), a laser diode, a light emitting diode (LED) or any other suitable type of optical transmitter. In some embodiments, the receiver 202b includes a single-photon avalanche diode (SPAD), an avalanche photodiode (APD) or any other suitable type of optical receiver. The tubular sleeve 204 and other components of the optical system 200 have been described with reference to FIGS. 2(a)-2(c) and FIGS. 3-8, and will not be described in detail herein.

The UI system 1080 provides an interface for interactions between a user and the apparatus 1000. The UI system 1080 may include a keyboard, a touch screen display device, a microphone, or a speaker, etc. In some embodiments, a user may use the UI system 1080 to start the process of diagnosing the optical system 200. In some embodiments, the apparatus 1000 may provide a warning to the user via the UI system 1080 when it is determined that the optical system 200 has a fault.

Figure 11:
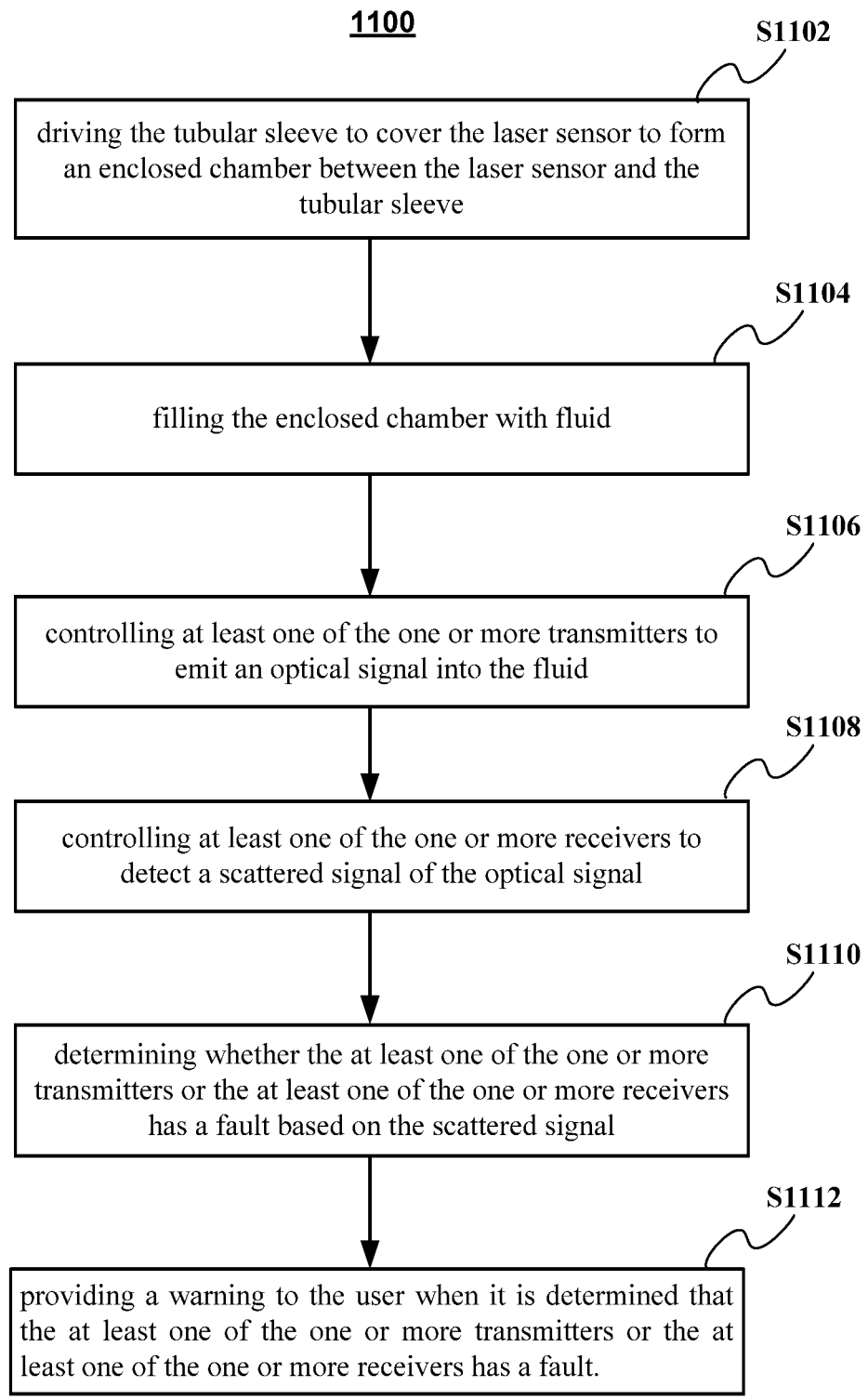
FIG. 11 illustrates a flow chart of a method for diagnosing an optical system according to an embodiment of the present disclosure.

Correspondingly, FIG. 11 illustrates a flow chart of a method 1100 for diagnosing an optical system. In some embodiment, the memory 1020 of the apparatus 1000 shown in FIG. 10 stores instructions corresponding to the method 1100, and by reading and executing the instructions, the processor 1040 is caused or configured to perform the steps of the method 1100, so as to diagnose the optical system 200 including the laser sensor 202 and the tubular sleeve 204. The laser sensor 202 includes one or more transmitters 202a and one or more receivers 202b, and the tubular sleeve 204 surrounds the laser sensor 202 and is configured to move upwards or downwards relative to the laser sensor 202 to cover or expose the laser sensor 202. In some embodiments, the optical system 200 is a LiDAR apparatus.

As shown in FIG. 11, in Step 1102, the tubular sleeve 204 is driven to cover the laser sensor 202 to form an enclosed chamber between the laser sensor 202 and the tubular sleeve 204.

In some embodiments, the processor 1040 may transmit a command to an actuator, and control the actuator to drive the tubular sleeve 204 to cover the laser sensor 202. The actuator may include the rack-and-pinion mechanism shown in FIG. 3, the rack-and-worm gear mechanism shown in FIG. 5, or other mechanisms. After the tubular sleeve 204 covers the laser sensor 202, an enclosed chamber is formed between the laser sensor 202 and the tubular sleeve 204.

In Step 1104, the enclosed chamber is filled with fluid.

In some embodiments, the processor 1040 may transmit a command to the inlet pump 210 shown in FIG. 6, and control the inlet pump 210 to pump a fluid from the fluid tank 214 into the enclosed chamber formed between the laser sensor 202 and the tubular sleeve 204. In some embodiments, the fluid is water. In some embodiments, the fluid is a cleaning fluid, and the diagnosing process may be performed while the cleaning fluid is being used to clean the laser sensor 202.

In Step 1106, at least one of the one or more transmitters 202a is controlled to emit an optical signal into the fluid.

In some embodiments, the processor 1040 may transmit a command to a specific transmitter 202a, and control the specific transmitter 202a to emit an optical signal. Thus, the apparatus 1000 can determine whether the specific transmitter 202a has a fault. In some embodiments, the processor 1040 may transmit commands to multiple or all transmitters 202a, and control the multiple or all transmitters 202a to emit optical signals in a predetermined order. Thus, the apparatus 1000 can determine whether the multiple or all transmitters 202a have faults.

In some embodiment, the optical signal has a predetermined waveform. For example, the predetermined waveform is a square wave as shown in FIG. 12 (a), or any other suitable shaped waveform. The predetermined waveform of the optical signal may be useful in diagnosing the optical system. In some embodiments, a wavelength of the optical signal is 905 nm or 950 nm. The optical signal with a wavelength of 905 nm or 950 nm can easily penetrate into the fluid, and then be scattered by the fluid.

In Step 1108, at least one of the one or more receivers 202b is controlled to detect a scattered signal of the optical signal.

Referring to FIG. 13, an optical path in the optical system 200 is illustrated according to an embodiment. As shown in FIG. 13, a transmitter 202a is controlled to emit an optical signal, the optical signal travels into the enclosed chamber 230 formed between the laser sensor 202 and the tubular sleeve 204 and filled with the fluid, and the optical signal is scattered by the liquid towards all directions. Then, at least one of the one or more receivers 202b is controlled to receive the scattered signal of the optical signal. Generally, a LiDAR apparatus can detect reflected light from a target with a light reflectance of rate 20% even at 100 meters or farther away. Thus, the scattered signal from the liquid is good enough to activate the receiver 202b (i.e., APD or SPAD) in the LiDAR apparatus.

In Step 1110, it is determined whether the at least one of the one or more transmitters or the at least one of the one or more receivers has a fault based on the scattered signal.

In some embodiment, if the receiver detects no scattered signal, or the intensity of the scattered signal is zero, the processor 1040 may determine that the at least one of the one or more transmitters 202a or the at least one of the one or more transmitters 202b has a fault.

In some embodiments, a waveform of the scattered signal is detected by a photoelectric conversion circuit (not shown) in the apparatus 1000, and then information about the waveform of the scattered signal is transmitted to the processor 1040. Thus, the processor 1040 can compare the waveform of the scattered signal with the predetermined waveform of the optical signal to determine whether the at least one of the one or more transmitters or the at least one of the one or more receivers has a fault. Generally, as the waveform of the optical signal emitted by the transmitter is predetermined, and properties of the material scattering the optical signal (for example, a reflection ratio of the fluid, a width of the enclosed chamber 230 between the laser sensor 202 and the tubular sleeve 204, etc.) are known, the waveform of the scattered signal can be determined. Thus, by comparing the waveform of the scattered signal with the predetermined waveform of the optical signal, status of the transmitter emitting the optical signal or the receiver receiving the scattered signal can be determined. For example, if there is a significant difference between the two waveforms, the processor 1040 may determine that the transmitter emitting the optical signal or the receiver receiving the scattered signal has a fault. In order to further determine whether the transmitter or the receiver is faulty, the processor 1040 needs to evaluate more waveforms of optical signals emitted by other transmitters and more waveforms of scattered signals received by other receivers, which will be described in detail hereinafter.

Figure 12A:
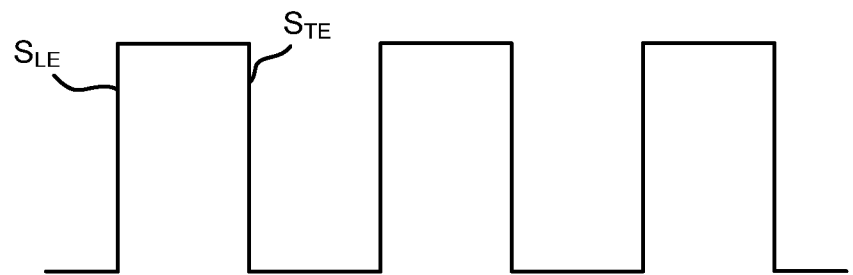
FIG. 12(a) illustrates a waveform of an optical signal emitted by a transmitter of an optical system.
Figure 12B:
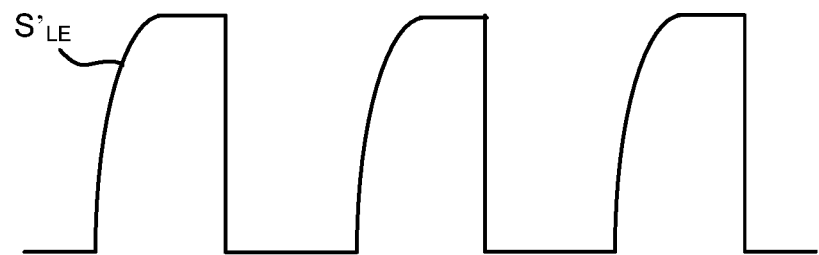
FIGS. 12(b) and 12(c) illustrate waveforms of scattered signals received by a receiver of the optical system according to an embodiment of the present disclosure.
Figure 12C:
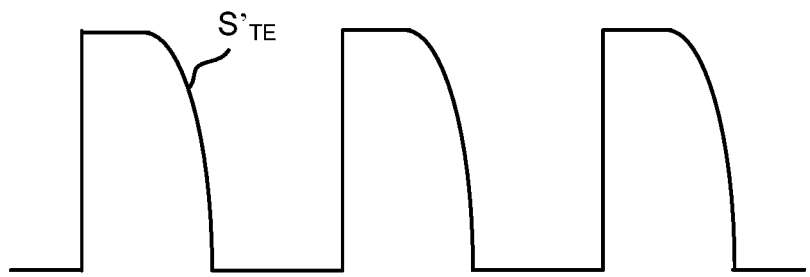

In some embodiments, the processor 1040 may control the at least one of the one or more transmitters 202b to detect a leading edge and a trailing edge of the waveform of the scattered signal, and then the processor 1040 may compare the leading edge and the trailing edge of the waveform of the scattered signal with a leading edge and a trailing edge of the predetermined waveform of the optical signal respectively to determine whether the at least one of the one or more transmitters or the at least one of the one or more transmitters has a fault. For example, the predetermined waveform of the optical signal may be a square wave as shown in FIG. 12(a), which has a vertical leading edge $S_{LE}$ and a vertical trailing edge $S_{TE}$. If the scattered signal has a titled leading edge $S'_{LE}$ as shown in FIG. 12(b), the processor 1040 may determine that the transmitter does not work properly when it is turned on to emit the optical signal, or the receiver does not work properly when it is activated by the scattered signal. If the scattered signal has a titled trailing edge $S'_{TE}$ as shown in FIG. 12(c), the processor 1040 may determine that the transmitter does not work properly when it is turned off to stop emitting the optical signal, or the receiver does not work properly when it is deactivated.

In Step 1112, a warning is provided to a user when it is determined that the at least one of the one or more transmitters or the at least one of the one or more transmitters has a fault.

In some embodiment, when it is determined that the at least one of the one or more transmitters or the at least one of the one or more transmitters has a fault, the processor 1040 may provide a warning to the user via the user interface system 1080 as shown in FIG. 10. For example, in order to provide the warning to the user, the processor 1040 may control a warning lamp of the user interface system 1080 to flash, or send a voice message via a speaker of the user interface system 1080, or present a text message on a displayer of the user interface system 1080.

Figure 14:
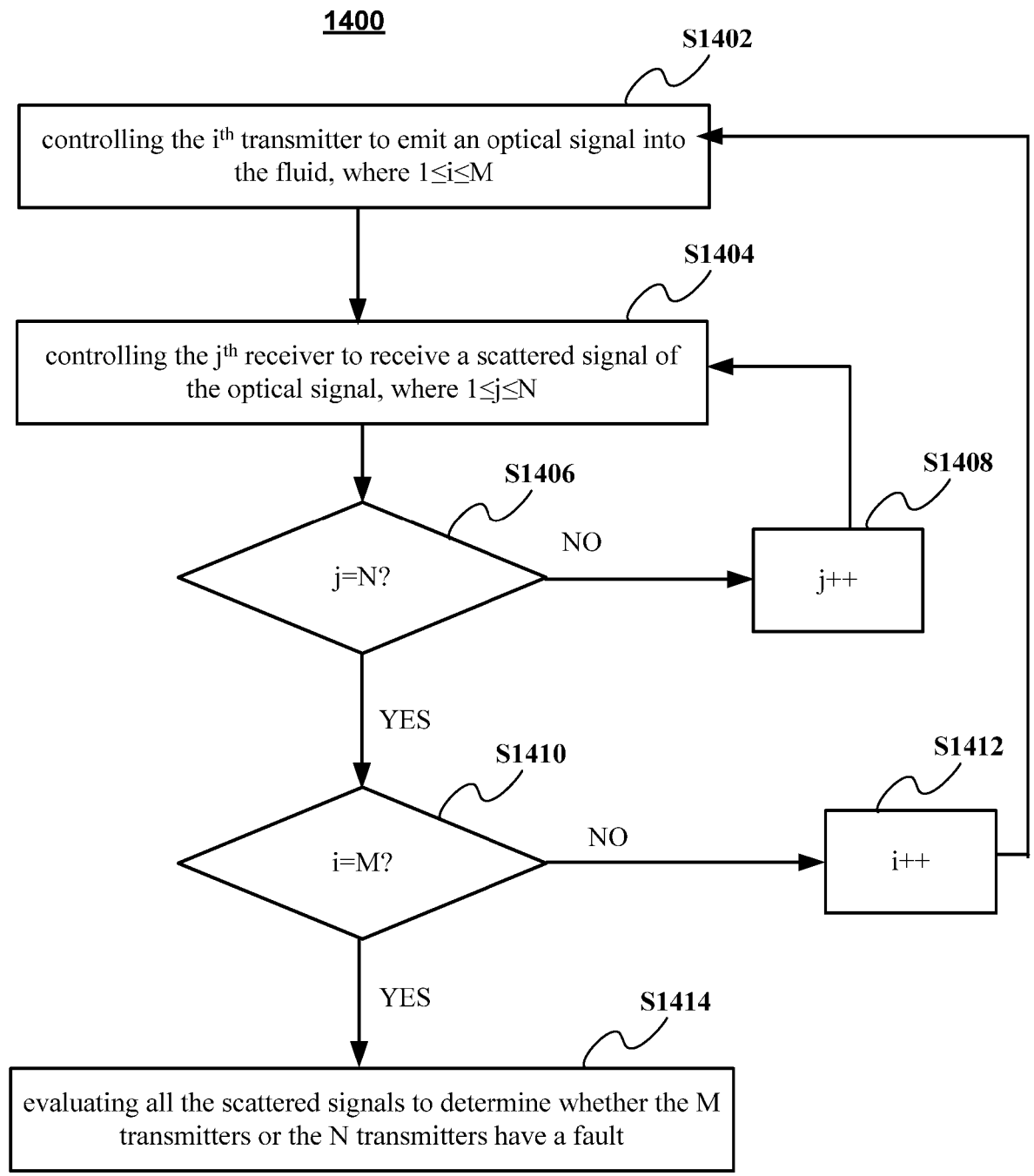
FIG. 14 illustrates a method for diagnosing the transmitters and the receivers in the laser sensor according to an embodiment of the present disclosure.
Figure 15:
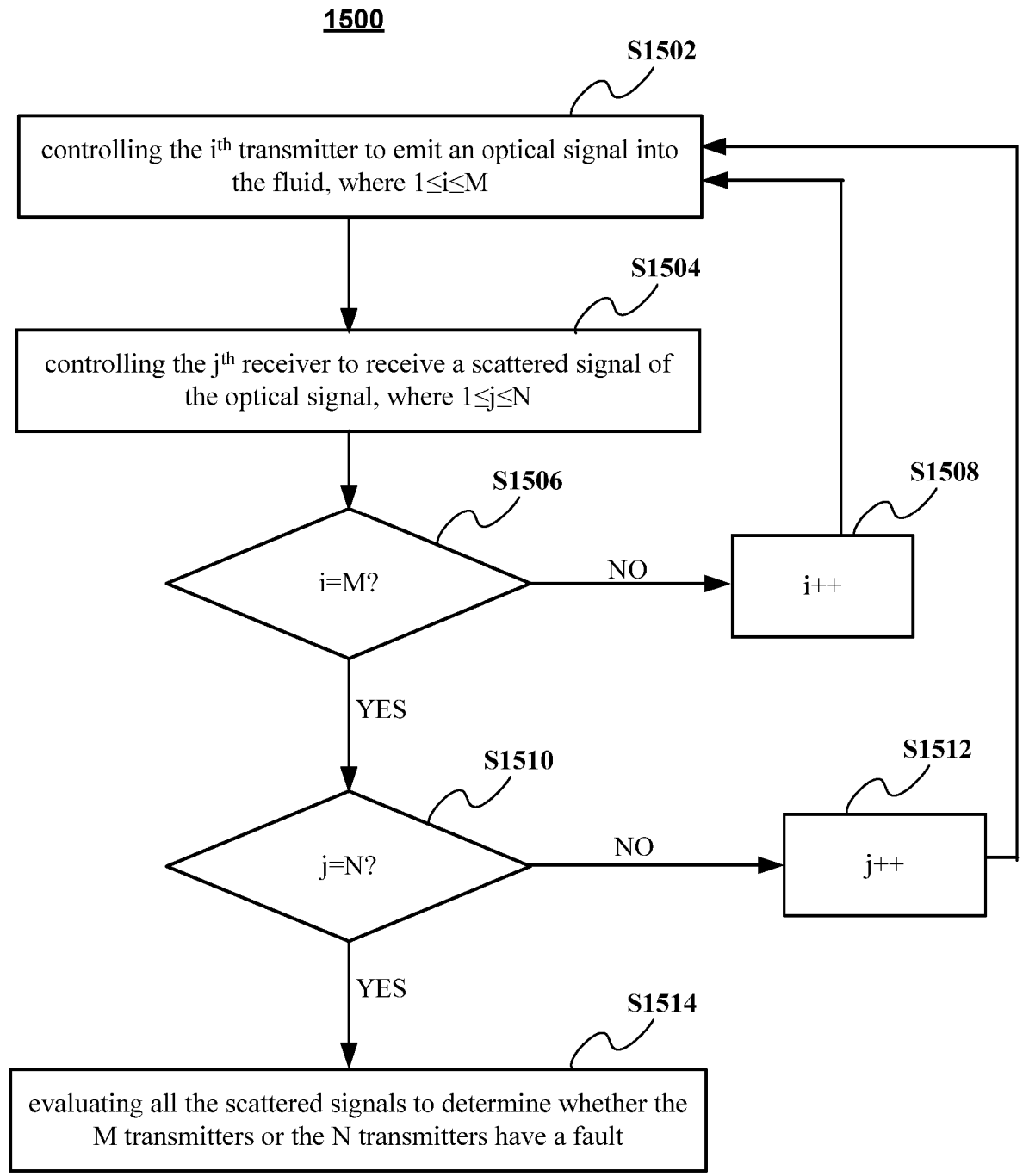
FIG. 15 illustrates another method for diagnosing the transmitters and the receivers in the laser sensor according to another embodiment of the present disclosure.

Referring back to FIG. 13, the laser sensor 202 may include M transmitters 202a and N receivers 202b, where M and N are both positive integers greater than one. The M transmitters 202a and the N receivers 202b may be arranged in a line or an array. FIG. 14 and FIG. 15 illustrate different methods for diagnosing all the M transmitters 202a and all the N receivers 202b in the laser sensor 202 according to different embodiments.

As shown in FIG. 14, in Step 1402, the $i^{th}$ transmitter of the M transmitters 202a is controlled to emit an optical signal into the fluid, where i is an integer and $1 \le i \le M$.

Step 1402 is performed after the tubular sleeve 204 has been driven to cover the laser sensor 202 to form an enclosed chamber between the laser sensor 202 and the tubular sleeve 204, and the enclosed chamber has been filled with fluid. It should be noted that i has an initial value of 1, and the $1^{st}$ transmitter may be the top one, the bottom one or any other one of the M transmitter 202a as shown in FIG. 13.

In Step 1404, the $j^{th}$ receiver of the N receivers 202b is controlled to receive a scattered signal of the optical signal, where j is an integer and $1 \le j \le N$. It should be noted that j also has an initial value of 1, and the $1^{st}$ receiver may be the top one, the bottom one or any other receiver of the N receivers 202b as shown in FIG. 13.

Then, in Step 1406, it is determined whether j is equal to N. If not, the method 1400 goes to Step 1408 in which the value of j is increased by 1, and then goes back to Step S1404. If yes, the method 1400 goes to Step 1410. That is, all the N receivers have been controlled to receive the scattered signal when the $i^{th}$ transmitter is controlled to emit the optical signal into the fluid. By evaluating waveforms of all the received scattered signals, the processor 1040 can determine whether the $i^{th}$ transmitter or any of the N receivers has a fault. For example, if none of the N receivers has received a scattered signal (i.e., waveforms of all the received scattered signals are a straight line), the $i^{th}$ transmitter is likely to be faulty. If a waveform of the scattered signal received by one receiver is different from waveforms of the scattered signals received by other receivers, that receiver is likely to be faulty.

In Step 1410, it is determined whether i is equal to M. If not, the method 1400 goes to Step 1412 in which the value of i is increased by 1, and then goes back to Step 1402. That is, each of the M transmitters shown in FIG. 13 will be controlled to emit the optical signal into the fluid in a predetermined order, for example, from top to bottom, or from bottom to top. If the result of the determination in Step S1410 is yes, which means that all the M transmitters have been controlled to emit optical signals having the predetermined waveform, the method 1400 goes to Step S1414, in which all the scattered signals are evaluated to determine whether the M transmitters or the N transmitters have a fault. In some embodiments, every time a receiver receives a scattered signal, information of a leading edge and a trailing edge of the received scattered signal (for example, represented by lead[i][j] and trail [i][j]) may be extracted and stored in the memory 1020. Then, in Step S1414, the processor 1040 may retrieve all the data about lead[i][j] and trail[i][j] from the memory 1020, and determine whether the M transmitters or the N transmitters have a fault.

FIG. 15 illustrates another method 1500 for diagnosing all the M transmitters 202a or all the N receivers 202b in the laser sensor 202 according to another embodiment.

As shown in FIG. 15, in Step 1502, the $i^{th}$ transmitter of the M transmitters 202a is controlled to emit an optical signal into the fluid, where i is an integer and $1 \leq i \leq M$. In Step 1504, the $j^{th}$ receiver of the N receivers 202b is controlled to receive a scattered signal of the optical signal, where j is an integer and $1 \leq j \leq N$ Steps 1502 and 1504 are similar to Steps 1402 and 1404 of the method 1400 shown in FIG. 14, and will not be described in detail herein.

Then, in Step 1506, it is determined whether i is equal to M. If not, the method 1500 goes to Step 1508 in which the value of i is increased by 1, and then goes back to Step S1502. If yes, the method 1500 goes to Step 1510. That is, all the M transistors have been controlled to emit an optical signal into the fluid, and the $j^{th}$ receiver is controlled to receive all the scattered signals related to all the M transmitters. By evaluating waveforms of all the received scattered signals, the processor 1040 can determine whether the M transmitters or the $j^{th}$ receiver has a fault. For example, if the $j^{th}$ receiver has not received a scattered signal (i.e., the waveform of the received scattered signal is always a straight line), the $j^{th}$ receiver is likely to be faulty. If a waveform of the scattered signal related to one transmitter is different from waveforms of the scattered signals related to the other transmitters, that transmitter is likely to be faulty.

In Step 1510, it is determined whether j is equal to N. If not, the method 1500 goes to Step 1512 in which the value of j is increased by 1, and then goes back to Step 1502. That is, each of the N receivers is controlled to receive the scattered signals when all of the M transmitters are controlled to emit the optical signals in the predetermined order. If the result of the determination in Step S1510 is yes, which means all the N receivers have been controlled to receive the scattered signals, the method 1500 goes to Step S1514, in which all the scattered signals are evaluated to determine whether the M transmitters or the N transmitters have a fault. Step 1514 is similar to Step 1414 of the method 1400, and will not be described in detail herein.

It should be noted that, the apparatuses and methods disclosed in the embodiments of the present disclosure can be implemented by other ways. The aforementioned apparatus and method embodiments are merely illustrative. For example, flow charts and block diagrams in the figures show the architecture and the function operation according to a plurality of apparatus, methods and computer program products disclosed in embodiments of the present disclosure. In this regard, each frame of the flow charts or the block diagrams may represent a module, a program segment, or portion of the program code. The module, the program segment, or the portion of the program code includes one or more executable instructions for implementing predetermined logical function. It should also be noted that in some alternative embodiments, the function described in the block can also occur in a different order as described from the figures. For example, two consecutive blocks may actually be executed substantially concurrently. Sometimes they may also be performed in reverse order, depending on the functionality. It should also be noted that, each block of the block diagrams and/or flow chart block and block combinations of the block diagrams and/or flow chart can be implemented by a dedicated hardware-based systems execute the predetermined function or operation or by a combination of a dedicated hardware and computer instructions.

If the functions are implemented in the form of software modules and sold or used as a standalone product, the functions can be stored in a computer readable storage medium. Based on this understanding, the technical nature of the present disclosure, part contributing to the prior art, or part of the technical solutions may be embodied in the form of a software product. The computer software product is stored in a storage medium, including several instructions to instruct a computer device (may be a personal computer, server, or network equipment) to perform all or part of the steps of various embodiments of the present. The aforementioned storage media include: U disk, removable hard disk, read only memory (ROM), a random access memory (RAM), floppy disk or CD-ROM, which can store a variety of program codes.

Various embodiments have been described herein with reference to the accompanying drawings. It will, however, be evident that various modifications and changes may be made thereto, and additional embodiments may be implemented, without departing from the broader scope of the invention as set forth in the claims that follow. Further, other embodiments will be apparent to those skilled in the art from consideration of the specification and practice of one or more embodiments of the invention disclosed herein. It is intended, therefore, that this disclosure and the examples herein be considered as exemplary only, with a true scope and spirit of the invention being indicated by the following listing of exemplary claims.

What is claimed is:

1. A method for diagnosing an optical system, the optical system comprising: a laser sensor comprising one or more transmitters and one or more receivers, and a tubular sleeve surrounding the laser sensor and configured to move upwards or downwards relative to the laser sensor to cover or expose the laser sensor, the method comprising:
   driving the tubular sleeve to move relative to the laser sensor, which is in a static state, to cover the laser sensor to form an enclosed chamber between the laser sensor and the tubular sleeve;
   filling the enclosed chamber with fluid;
   controlling at least one of the one or more transmitters to emit an optical signal into the fluid such that the optical signal is scattered by the fluid to generate a scattered signal;
   controlling at least one of the one or more receivers to detect the scattered signal; and
   determining whether the at least one of the one or more transmitters or the at least one of the one or more receivers has a fault based on the scattered signal and properties of the fluid in the enclosed chamber.

2. The method of claim 1, wherein the optical signal having a predetermined waveform.

3. The method of claim 2, wherein determining whether the at least one of the one or more transmitters or the at least one of the one or more receivers has a fault based on the scattered signal comprises:
   detecting a waveform of the scattered signal; and
   comparing the waveform of the scattered signal with the predetermined waveform of the optical signal to determine whether the at least one of the one or more transmitters or the at least one of the one or more receivers has a fault.

4. The method of claim 3, wherein comparing the waveform of the scattered signal with the predetermined waveform of the optical signal to determine whether the at least one of the one or more transmitters or the at least one of the one or more receivers has a fault comprises:
  detecting a leading edge and a trailing edge of the scattered signal; and
  comparing the leading edge and the trailing edge of the scattered signal with a leading edge and a trailing edge of the predetermined waveform of the optical signal respectively to determine whether the at least one of the one or more transmitters or the at least one of the one or more transmitters has a fault.

5. The method of claim 2, wherein the predetermined waveform comprises a square wave.

6. The method of claim 1, wherein controlling at least one of the one or more transmitters to emit an optical signal into the fluid comprises: controlling all of the one or more transmitters to emit the optical signal into the fluid in a predetermined order; and
  controlling at least one of the one or more receivers to detect a scattered signal of the optical signal comprises: controlling all of the one or more receivers to detect the scattered signal when any of the one or more transmitters is controlled to emit the optical signal into the fluid.

7. The method of claim 1, wherein controlling at least one of the one or more transmitters to emit an optical signal into the fluid comprises: controlling all of the one or more transmitters to emit the optical signals into the fluid in a predetermined order for one or more periods; and
  controlling at least one of the one or more receivers to detect a scattered signal of the optical signal comprises: controlling each of the one or more receivers to detect the scattered signals in one period that all of the one or more transmitters are controlled to emit the optical signals into the fluid in the predetermined order.

8. The method of claim 1, further comprising:
  providing a warning to a user when it is determined that the at least one of the one or more transmitters or the at least one of the one or more receivers has a fault.

9. The method of claim 1, wherein the laser sensor is a light-detection and ranging (LiDAR) apparatus.

10. The method of claim 1, wherein the fluid is cleaning fluid for cleaning the laser sensor.

11. An apparatus for diagnosing an optical system, comprising:
  a processor; and
  a memory coupled to the processor to store instructions, which when executed by the processor, cause the processor to perform operations of diagnosing an optical system, the optical system comprising: a laser sensor comprising one or more transmitters and one or more receivers, and a tubular sleeve surrounding the laser sensor and configured to move upwards or downwards relative to the laser sensor to cover or expose the laser sensor, the operations comprising:
  driving the tubular sleeve to move relative to the laser sensor, which is in a static state, to cover the laser sensor to form an enclosed chamber between the laser sensor and the tubular sleeve;
  filling the enclosed chamber with fluid;
  controlling at least one of the one or more transmitters to emit an optical signal into the fluid such that the optical signal is scattered by the fluid to generate a scattered signal;
  controlling at least one of the one or more receivers to detect the scattered signal; and
  determining whether the at least one of the one or more transmitters or the at least one of the one or more receivers has a fault based on the scattered signal and properties of the fluid in the enclosed chamber.

12. The apparatus of claim 11, wherein the optical signal having a predetermined waveform.

13. The apparatus of claim 12, wherein determining whether the at least one of the one or more transmitters or the at least one of the one or more receivers has a fault based on the scattered signal comprises:
  detecting a waveform of the scattered signal; and
  comparing the waveform of the scattered signal with the predetermined waveform of the optical signal to determine whether the at least one of the one or more transmitters or the at least one of the one or more receivers has a fault.

14. The apparatus of claim 13, wherein comparing the waveform of the scattered signal with the predetermined waveform of the optical signal to determine whether the at least one of the one or more transmitters or the at least one of the one or more receivers has a fault comprises:
  detecting a leading edge and a trailing edge of the scattered signal; and
  comparing the leading edge and the trailing edge of the scattered signal with a leading edge and a trailing edge of the predetermined waveform of the optical signal respectively to determine whether the at least one of the one or more transmitters or the at least one of the one or more transmitters has a fault.

15. The apparatus of claim 12, wherein the predetermined waveform comprises a square wave.

16. The apparatus of claim 11, wherein controlling at least one of the one or more transmitters to emit an optical signal into the fluid comprises: controlling all of the one or more transmitters to emit the optical signal into the fluid in a predetermined order; and
  controlling at least one of the one or more receivers to detect a scattered signal of the optical signal comprises: controlling all of the one or more receivers to detect the scattered signal when any of the one or more transmitters is controlled to emit the optical signal having the predetermined waveform.

17. The apparatus of claim 11, wherein controlling at least one of the one or more transmitters to emit an optical signal into the fluid comprises: controlling all of the one or more transmitters to emit the optical signals into the fluid in a predetermined order for one or more periods; and
  controlling at least one of the one or more receivers to detect a scattered signal of the optical signal comprises: controlling each of the one or more receivers to detect the scattered signals in one period that all of the one or more transmitters are controlled to emit the optical signals having the predetermined waveforms in the predetermined order.

18. The apparatus of claim 11, wherein the operations further comprising:
  providing a warning to a user when it is determined that the at least one of the one or more transmitters or the at least one of the one or more receivers has a fault.

19. The apparatus of claim 11, wherein the laser sensor is a light-detection and ranging (LiDAR) apparatus.

20. The apparatus of claim 11, wherein the fluid is cleaning fluid for cleaning the laser sensor.

* * * * *